(12) United States Patent
Astrand (10) Patent No.: US 8,332,846 B2
(45) Date of Patent: Dec. 11, 2012

(54) SELECTIVE EXPOSURE TO USB DEVICE FUNCTIONALITY FOR A VIRTUAL MACHINE BY FILTERING DESCRIPTORS

(75) Inventor: Per Emil Astrand, Lund (SE)

(73) Assignee: Sony Mobile Communications AB, Lund (SE)

( * ) Notice: Subject to any disclaimer, the term of this patent is extended or adjusted under 35 U.S.C. 154(b) by 1321 days.

(21) Appl. No.: 12/038,943

(22) Filed: Feb. 28, 2008

(65) Prior Publication Data

US 2009/0222814 A1    Sep. 3, 2009

(51) Int. Cl.
*G06F 9/455*    (2006.01)
*G06F 13/38*    (2006.01)

(52) U.S. Cl. .................................... 718/1; 710/72
(58) Field of Classification Search ......... 718/1; 710/72
See application file for complete search history.

(56) References Cited

U.S. PATENT DOCUMENTS

| | | | |
|---|---|---|---|
| 6,754,725 B1 * | 6/2004 | Wright et al. ............... | 710/8 |
| 7,043,575 B2 * | 5/2006 | Stephan ....................... | 710/36 |
| 7,082,598 B1 | 7/2006 | Le et al. | |
| 7,467,381 B2 * | 12/2008 | Madukkarumukumana et al. ........................... | 718/1 |
| 7,562,159 B2 * | 7/2009 | Chen et al. .................. | 710/8 |
| 8,001,544 B2 * | 8/2011 | Brice et al. ................. | 718/1 |
| 2002/0143842 A1 | 10/2002 | Cota-Robles et al. | |
| 2006/0248528 A1 * | 11/2006 | Oney et al. .................. | 718/1 |
| 2007/0294707 A1 | 12/2007 | Taillefer et al. | |

OTHER PUBLICATIONS

International Search Report and Written Opinion issued in corresponding international application No. PCT/IB2008/053430, mailed Jan. 20, 2009, 14 pages.

* cited by examiner

*Primary Examiner* — Meng An
*Assistant Examiner* — Brian Chew
(74) *Attorney, Agent, or Firm* — Snyder, Clark, Lesch & Chung, LLP (57) ABSTRACT

A virtual machine (VM) application may run a guest operating system (OS) and allow the guest OS to connect to USB devices connected to a computer. The VM application may filter the functions associated with the USB device so that only some of the functions of the USB device are exposed to the guest OS.

20 Claims, 9 Drawing Sheets

SELECTIVE EXPOSURE TO USB DEVICE FUNCTIONALITY FOR A VIRTUAL MACHINE BY FILTERING DESCRIPTORS

BACKGROUND

A virtual machine (VM) can be defined as a software implementation of a computing device that executes programs as if it were a real computing device (or an abstraction of a real computing device). In other words, software may be written to run on a virtual machine.

In a common VM implementation, a user may work with a number of applications (e.g., word processing, spreadsheet, etc.) from a main ("host") operating system. One of the applications may be a VM application. Within the VM application, a guest operating system may be run. The guest operating system may be a fully functioning operating system that is confined to a virtual hardware computing device that is presented by the VM application to the guest operating system.

VMs are commonly used in a number of situations. For example, a VM may be used to provide access to multiple different operating systems or to provide an isolated instance of an operating system. Additionally, VMs may be used in the corporate environment to simplify deployment and management of computing environments to employees.

External devices are commonly connected to computers through a universal serial bus (USB) connection. The software that enables the VM may allow the VM to connect to and use the features of the USB device. A user may, for example, insert a USB networking or mass storage device into the USB port of a computer and then access these functions of the USB device from within the guest operating system being run by the VM.

SUMMARY

According to one aspect, a computing device implemented method may include receiving, in response to initial discovery of a Universal Serial Bus (USB) device, descriptors that describe functionality of the USB device; filtering the descriptors to selectively remove functions of the USB device and that are described by the descriptors; and forwarding the filtered descriptors to an operating system that is running as a guest operating system for a virtual machine.

Additionally, the USB device may be a composite device that provides a plurality of functions over a USB interface.

Additionally, the filtered descriptors may be filtered such that the composite USB device is seen as a non-composite USB device by the guest operating system.

Additionally, the method may include, receiving, by a host operating system, a non-filtered version of the descriptors for the composite USB device.

Additionally, the filtering may be performed for pre-determined USB devices or functions.

Additionally, the USB device may be a portable communication device that includes mass storage and networking functions and where descriptors relating to the mass storage function are removed by the filtering.

Additionally, the guest operating system may controlled by a virtual machine application.

Additionally, the virtual machine application may present a virtual hardware platform to the guest operating system.

Additionally, the virtual machine application may filter the descriptors.

According to another aspect, a device may include a hardware layer that includes computing hardware associated with the device, including hardware to interact with Universal Serial Bus (USB) devices. The device may also include a host operating system to interact with the hardware layer; and a virtual machine application to control one or more guest operating systems, the virtual machine application may filter descriptors received from USB devices so that select functions associated with the USB devices are not visible from the one or more guest operating systems.

Additionally, filtering the descriptors received from the USB device may include removing descriptors relating to predetermined features.

Additionally, the USB device may include composite USB devices that provide a number of functions.

Additionally, the composite device may be seen as a non-composite device by the one or more guest operating systems.

Additionally, the host operating system may have access to all of the functions of the composite device.

Additionally, the USB device may include a portable communication device that includes mass storage and networking functions over USB and where descriptors relating to the mass storage function are removed by the filtering.

Additionally, where the virtual machine application presents a virtual hardware platform to the guest operating system.

According to yet another aspect, a virtual machine application may execute on a computing device. The virtual machine application may include instructions to present a virtual computer platform to a guest operating system, the virtual computer platform including a virtual USB interface. The application may further include instructions to hide select functions of USB devices connected to the computing device from the guest operating system.

Additionally, the virtual machine application may hide the select functions of the USB device by filtering USB descriptors communicated during a USB device enumeration process.

Additionally, the USB devices may include composite USB devices.

According to yet another aspect, a computer-readable medium may containing instructions executable by at least one processor. The computer-readable medium may comprise instructions to receive, in response to initial discovery of a Universal Serial Bus (USB) device, descriptors that describe functionality of the USB device; instructions to filter the descriptors to selectively remove functions of the USB device that are described by the descriptors; and instructions to forward the filtered descriptors to an operating system that is running as a guest operating system for a virtual machine.

Additionally, the USB device may be a composite device that provides a plurality of functions over a USB interface.

Additionally, the filtered descriptors may be filtered such that the composite USB device is seen as a non-composite USB device by the guest operating system.

Additionally, the guest operating system may be controlled by a virtual machine application.

Additionally, the virtual machine application may presents a virtual hardware platform to the guest operating system.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following description does not limit the invention.

Overview

A VM application may run a guest operating system (OS) and allow the guest OS to connect to USB devices connected to a computer. The USB devices may be composite USB devices that expose multiple functions to the computing device. The VM application may filter the functions associated with the USB device so that only some of the functions of the USB device are exposed to the guest OS.

Exemplary System Configuration

Figure 1:
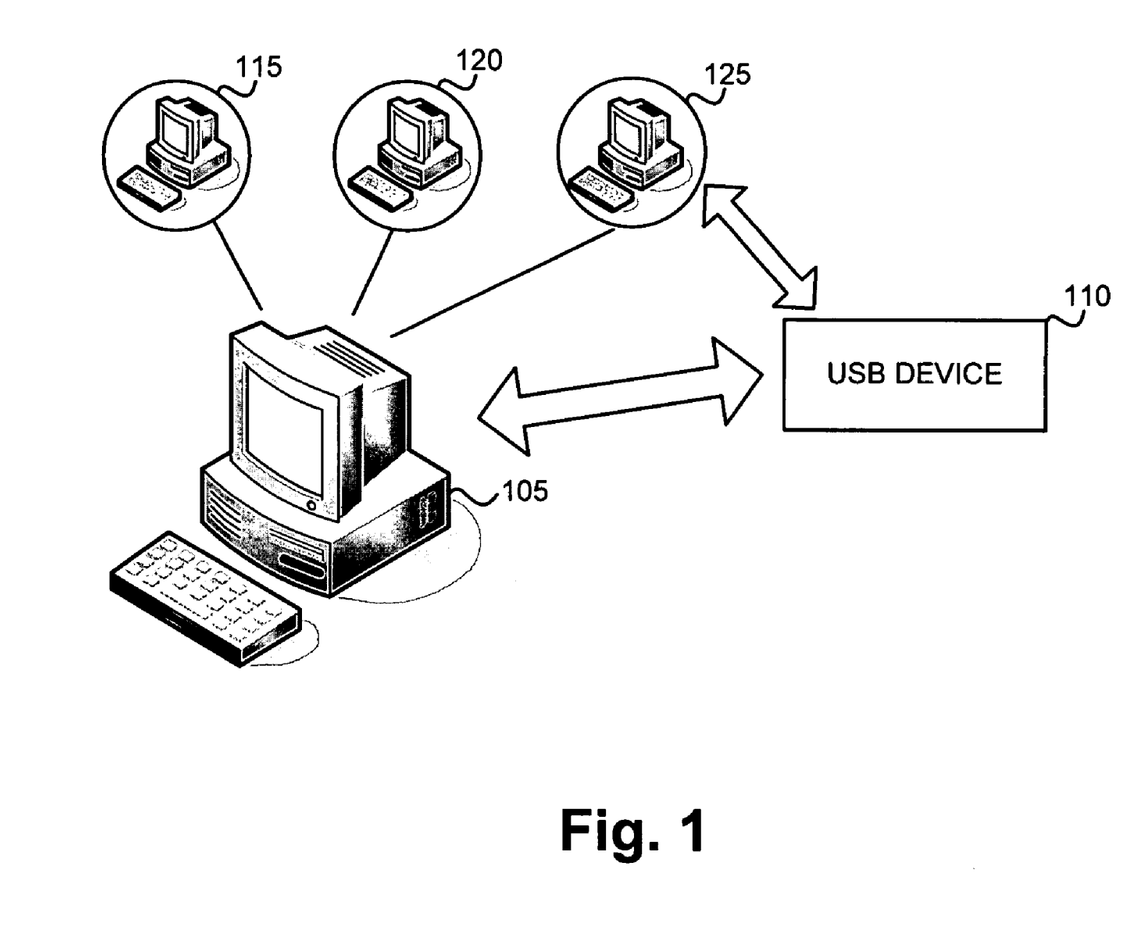
FIG. 1 is an exemplary diagram of an environment or system in which concepts described herein may be implemented.

FIG. 1 is an exemplary diagram of an environment or system in which concepts described herein may be implemented. The environment may include a computing device 105 connected to a USB device 110. Computing device 105 may include, for example, a personal computer such as desktop or laptop computer used for general computing tasks. In some implementations, computing device 105 may be a server computer designed to be accessed by many end-users.

In one particular implementation, computing device 105 may execute a VM application that allows virtual guest operating systems to be run in conjunction with the primary "host" operating system implemented by computing device 105. As illustrated in FIG. 1, three guest operating systems 115, 120, and 125 are shown. Guest OSes 115, 120, and 125 may include different instances of the host (main) OS used on computing device 105 or may include different OSes than the host OS. For example, the host OS for computing device 105 may be a Windows™-based operating system from Microsoft Corporation, guest OSes 115 and 120 may be Linux-based operating systems, and guest OS 125 may be another Windows-based operation system.

USB device 110 may include any of a number of devices designed to communicate using the USB standard. Guest OSes 115, 120, and 125 may also be allowed to access USB device 110. In one particular exemplary implementation, USB device 110 may include a portable communication device such as a cellular phone, smart phone, or personal digital assistant (PDA). The portable communication device may be a device that provides connectivity to a network, such as a wireless telecommunications network (e.g., a cellular network). The portable communication device may connect wirelessly to the network to communicate voice, video, and/or data.

Exemplary Device

Figure 2:
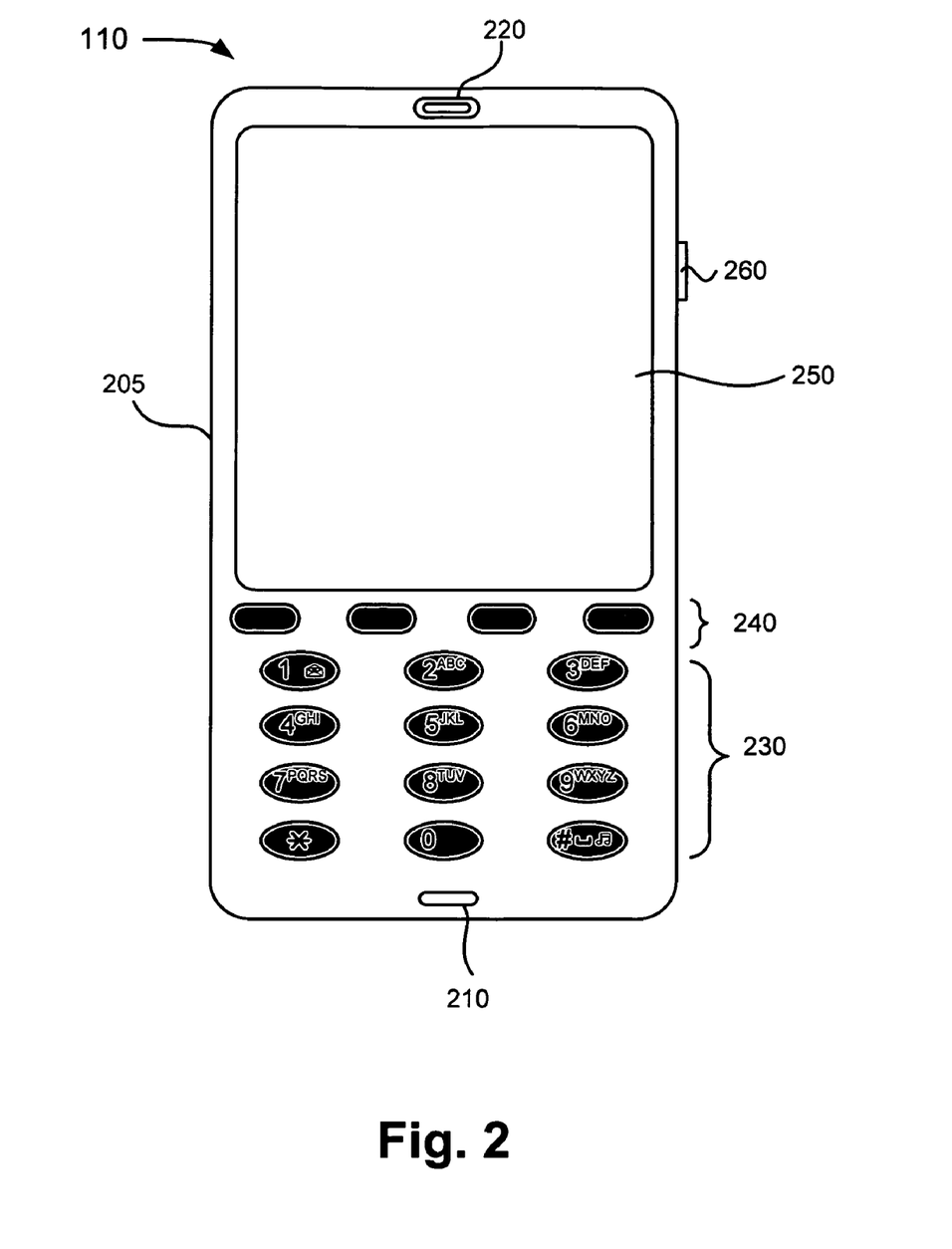
FIG. 2 is a diagram illustrating a front view of exemplary external components of a portable communication device.

FIG. 2 is a diagram illustrating a front view of exemplary external components of USB device 110. In this example, USB device 110 is a portable communication device. More generally, and as previously mentioned, USB device 110 can be any USB device. As illustrated, device 110 may include a housing 205, a microphone 210, a speaker 220, a keypad 230, function keys 240, a display 250, and a camera/video activation button 260.

Housing 205 may include a structure configured to contain components of device 110. For example, housing 205 may be formed from plastic and may be configured to support microphone 210, speaker 220, keypad 230, function keys 240, display 250, and camera/video activation button 260.

Microphone 210 may include any component capable of transducing air pressure waves to a corresponding electrical signal. For example, a user may speak into microphone 210 during a telephone call. Speaker 220 may include any component capable of transducing an electrical signal to a corresponding sound wave. For example, a user may listen to music through speaker 220.

Keypad 230 may include any component capable of providing input to device 100. Keypad 230 may include a standard telephone keypad. Keypad 230 may also include one or more special purpose keys. In one implementation, each key of keypad 230 may be, for example, a pushbutton. A user may utilize keypad 230 for entering information, such as text or a phone number, or activating a special function.

Function keys 240 may include any component capable of providing input to device 110. Function keys 240 may include a key that permits a user to cause device 110 to perform one or more operations. The functionality associated with a key of function keys 240 may change depending on the mode of device 110. For example, function keys 240 may perform a variety of operations, such as placing a telephone call, playing various media, or accessing an application. Function keys 240 may include a key that provides a cursor function and a select function. In one implementation, each key of function keys 240 may be, for example, a pushbutton.

Display 250 may include any component capable of providing visual information. For example, in one implementation, display 250 may be a liquid crystal display (LCD). In another implementation, display 250 may be any one of other display technologies, such as a plasma display panel (PDP), a field emission display (FED), a thin film transistor (TFT) display, etc. Display 250 may display, for example, text, image, and/or video information.

Camera/video activation button 260 may be a pushbutton that enables a user to initiate taking an image or to initiate taking a series of images (i.e., video). Camera/video activation button 260 may activate a camera located at, for example, the back of device 110 (not shown).

Figure 3:
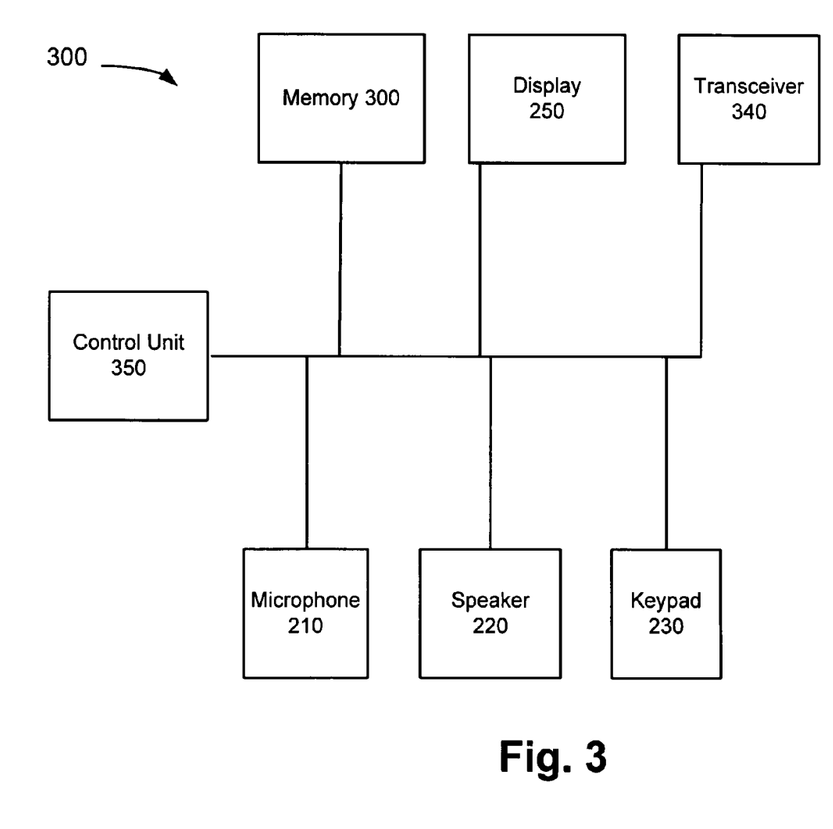
FIG. 3 is a diagram illustrating exemplary internal components of the devices shown in FIGS. 1 and 2.

FIG. 3 is a diagram illustrating exemplary internal components of a device 300, such as USB device 110 when it is a portable communication device or computing device 105. As illustrated, device 300 may include microphone 210, speaker 220, keypad 230, display 250, a memory 300, a transceiver 340, and a control unit 350. Microphone 210, speaker 220, keypad 230, and display 250 may represent the circuitry or other processing elements associated with the corresponding elements shown in FIG. 2. Accordingly, no further description of these elements will be provided with respect to FIG. 3.

Memory 300 may include any type of computer-readable medium to store data and instructions related to the operation and use of device 300. For example, memory 300 may include a memory component, such as a random access memory (RAM), dynamic random access memory (DRAM), static random access memory (SRAM), synchronous dynamic random access memory (SRAM), ferroelectric random access memory (FRAM), a read only memory (ROM), a programmable read only memory (PROM), an erasable programmable read only memory (EPROM), electrically erasable read only memory (EEPROM), and/or flash memory. Additionally, memory 300 may include a storage component, such as a magnetic storage component (e.g., a hard drive), a compact disc (CD) drive, a digital versatile disc (DVD) drive, or another type of computer-readable medium. When device 300 is a USB device, memory 300 may be particularly used as a storage device for computing device 105.

Transceiver 340 may include any component capable of transmitting and receiving information. For example, transceiver 340 may include a circuit that provides wireless or wired communication with a network or another device.

Control unit 350 may include any logic that may interpret and execute instructions, and may control the overall operation of device 300. Logic, as used herein, may include hardware, software, and/or a combination of hardware and software. Control unit 350 may include, for example, a general-purpose processor, a microprocessor, a data processor, a co-processor, an application specific integrated circuit (ASIC), field programmable gate array (FPGA), and/or a network processor. Control unit 350 may access instructions from memory 300, from other components of device 300, and/or from a source external to device 300 (e.g., a network or another device).

Although FIGS. 2 and 3 illustrate exemplary internal and external components, in other implementations, device 300 may include fewer, additional, and/or different components than the exemplary components depicted in FIGS. 2 and 3. In still other implementations, one or more components of device 300 may include the capabilities of one or more other components of device 300. For example, transceiver 340 and/or control unit 350 may include their own on-board memory 300. Additionally, hardwired circuitry may be used in place of or in combination with software instructions to implement operations of device 300. Thus, implementations described herein are not limited to any specific combination of hardware circuitry and software.

Virtual Machine Overview

Figure 4A:
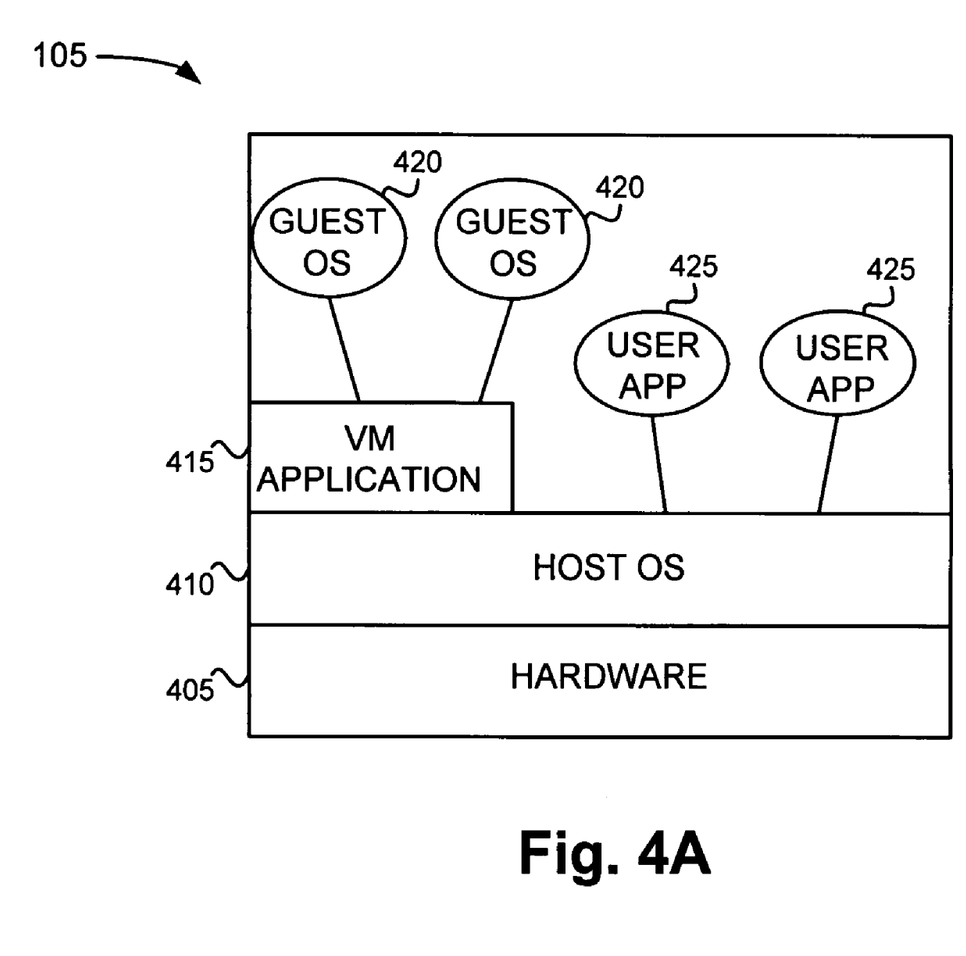
FIGS. 4A and 4B are diagrams illustrating exemplary architectures of virtual machines.
Figure 4B:
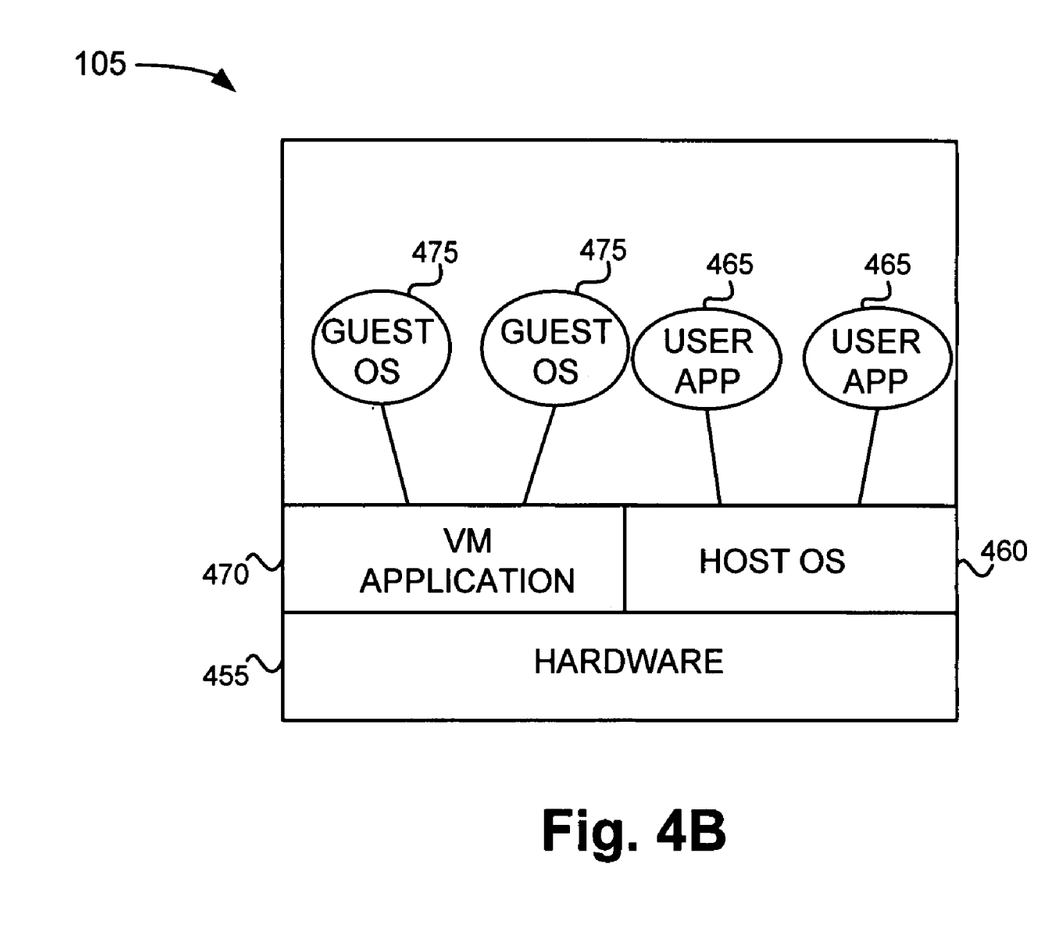

Before describing selective exposure to USB device functionality in additional detail, an overview of a computing device implementing a virtual machine will be given. FIGS. 4A and 4B are diagrams illustrating exemplary architectures of virtual machines.

FIG. 4A is a diagram illustrating an exemplary virtual machine operating at the host OS application layer. As shown in FIG. 4A, computing device 105 may include a hardware layer 405, a host OS layer 410, a VM application 415, one or more VM guest OSes 420, and one or more user applications 425.

Hardware layer 405 may include the hardware and/or the hardware interface presented by computing device 105. Host OS 410 may include the primary OS used to run computing device 105. Host OS 410 may generally interact with hardware layer 405 to present a useful interface to the user.

Through host OS 410, a number of applications may execute, such as VM application 415 and user applications 425. Additionally, guest OSes 420 may execute "within" VM application 415. VM application 415 may include the virtual machine software that provides an interface for guest OSes 420. VM application 415 may provide a contained environment for the execution of guest OSes 420. Additionally, VM application 415 may present a virtual hardware interface to guest OSes 420. From the point of view of guest OSes 420, the virtual hardware interface presented by VM application 415 is the "real" hardware for the computing device.

User applications 425 may execute at computing device 105 concurrently with the execution of VM guest OSes 420. Thus, a user of computing device 105 may conveniently switch between user applications 425 and guest OSes 420.

FIG. 4B is a diagram illustrating an exemplary configuration for a VM in the so-called "OS-level virtualization" configuration. As shown in FIG. 4B, computing device 105 may include a hardware layer 455, a host OS layer 460, user applications 465, a VM application 470, and VM guest OSes 475. Compared to the architecture shown in FIG. 4A, the virtual machine architecture shown in FIG. 4B may be thought of as a hosted virtual machine, as VM application 470 communicates directly with hardware layer 455 instead of through a primary OS.

VM application 470 may include the virtual machine software that provides an interface for VM guest OSes 475. VM application 470 may communicate directly with hardware layer 455 and may provide a hardware interface to guest OSes 475. In one implementation, the hardware interface provided by VM application 470 may be the same interface presented by the underlying hardware layer 455.

Through host OS 410, a number of user applications 465 may execute. Similarly, through guest OSes 475, additional user applications may execute within the virtual machines defined by the guest OSes 475. User applications 465 may execute at computing device 105 concurrently with the execution of guest OSes 475. Thus, a user of computing device 105 may conveniently switch between user applications 465 and applications executing within guest OSes 475.

Figure 5:
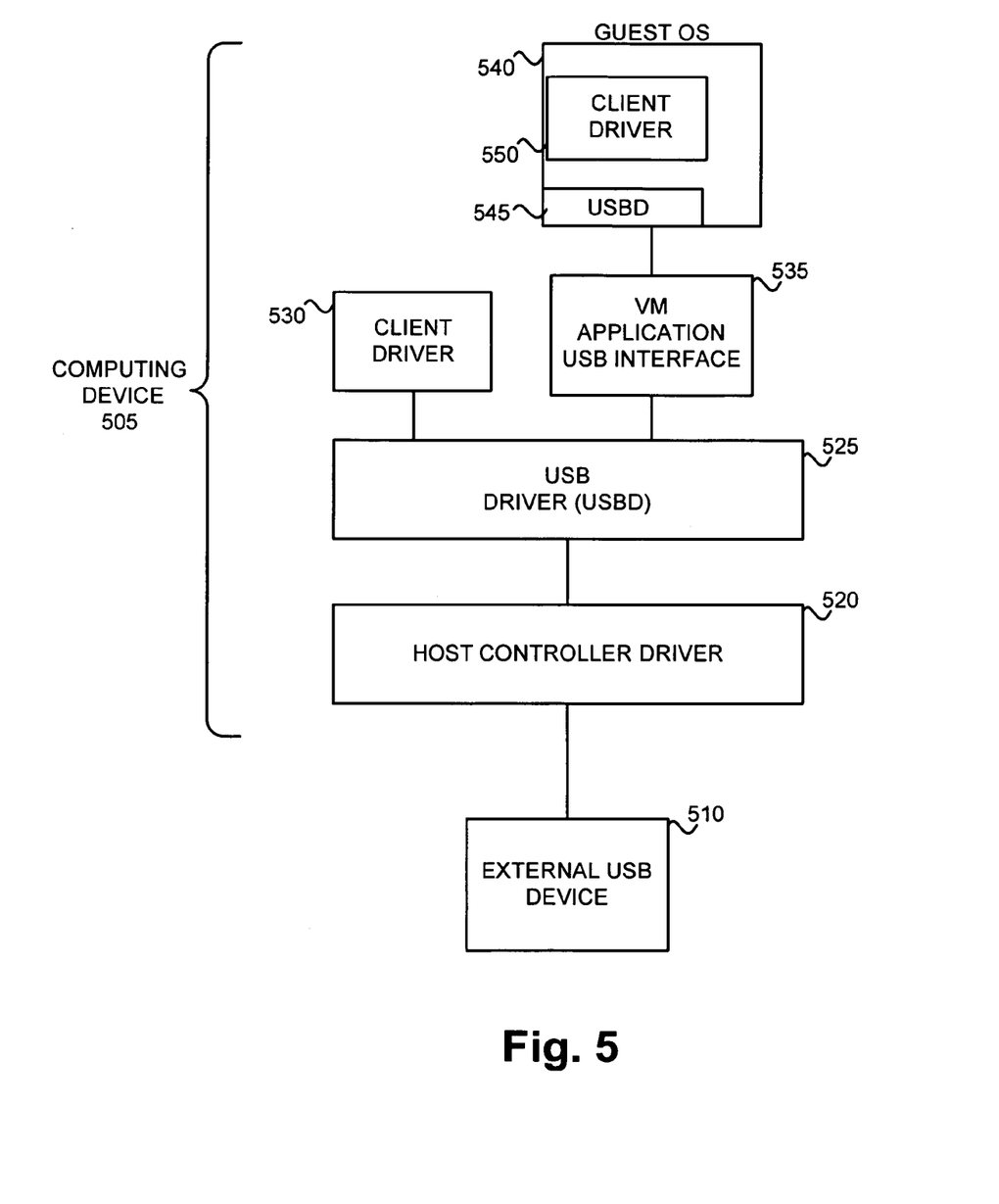
FIG. 5 is a diagram illustrating exemplary components of a computing device executing a virtual machine in the virtual machine architecture shown in FIG. 4A.

FIG. 5 is a diagram illustrating exemplary components of a computing device executing a virtual machine in the virtual machine architecture shown in FIG. 4A. The components shown in FIG. 5 are particularly relevant to USB access.

As shown in FIG. 5, an external USB device 510 is connected, via a USB physical interface, to a computing device 505. Computing device 505 may be, for example, similar to computing device 105 and external USB device 510 may be similar to USB device 110. USB device 510 may be, for example, a mobile phone with a USB interface. The USB interface may be used to access multiple functions on the USB device, such as mass storage capabilities (e.g., a USB drive) and networking capabilities (e.g., a network connection through a short-range or long-range wireless transceiver).

Computing device 505 may include host controller driver 520, USB driver (USBD) 525, client driver 530, virtual machine (VM) application USB interface 535, and guest OS 540. Guest OS 540 may further include USB driver 545 and client driver 550.

Host controller driver 520 may represent the hardware USB interface in computing device 505. Host controller driver 520 may thus include the circuitry and associated low-level software required to implement USB communications at computing device 505. USB driver 525 may include software that abstracts the details of host controller driver 520 to present a generic USB interface to a particular host operating system running on computing device 505.

Client driver 530 may include drivers used by the host OS for a particular USB device. For example, external USB device 510 may include functionality for a mass storage USB, a USB networking device, a USB smartcard, etc. Client driver 530 may be software executed by the host OS that allows the host OS to use the functions of the particular USB device. A driver for a USB device may be loaded, for example, when the USB device is first inserted in computing device 505.

VM application USB interface 535 may represent the portion of VM application 415 that is related to USB. VM application USB interface 535 may generally interact with USB driver 525 to present a "virtual" USB driver interface to guest OS 540. From the point of view of guest OS 540, VM application USB interface 535 may appear to be a host controller driver, such as host controller driver 520.

Guest OS 540 may itself include a USB driver 545 and client USB drivers 550. USB driver 545 may be similar to the USB driver 525 that is run by the host OS. Similarly, client driver 550 may include client USB drivers for various USB devices.

USB device 510 may be a composite USB device that exposes multiple functions to computing device 505. Consistent with aspects described herein, VM application USB interface 535 may selectively filter communications between USB devices and guest OS 540 so that certain of the functions of a composite USB device may be hidden from the guest OS.

There may be a number of situations in which it may be desirable to filter or hide functions of a USB device from a guest OS. For example, assume the USB device is a mobile communication device that has mass storage and networking capability. Further, assume images of guest OSes are stored on the mass storage of the USB device. It may be desirable, when the USB device is plugged into the host computer, to run a guest OS based on the guest OS image stored on the USB device. Although it may be useful to use the network functionality of the USB device through the guest OS, allowing the guest OS to see and potentially change the file that describes the guest OS, however, may cause problems with the operation of the guest OS. Accordingly, it may be desirable to hide the mass storage ability of the USB device from the guest OS while still allowing the guest OS to use the networking ability of the USB device.

Figure 6:
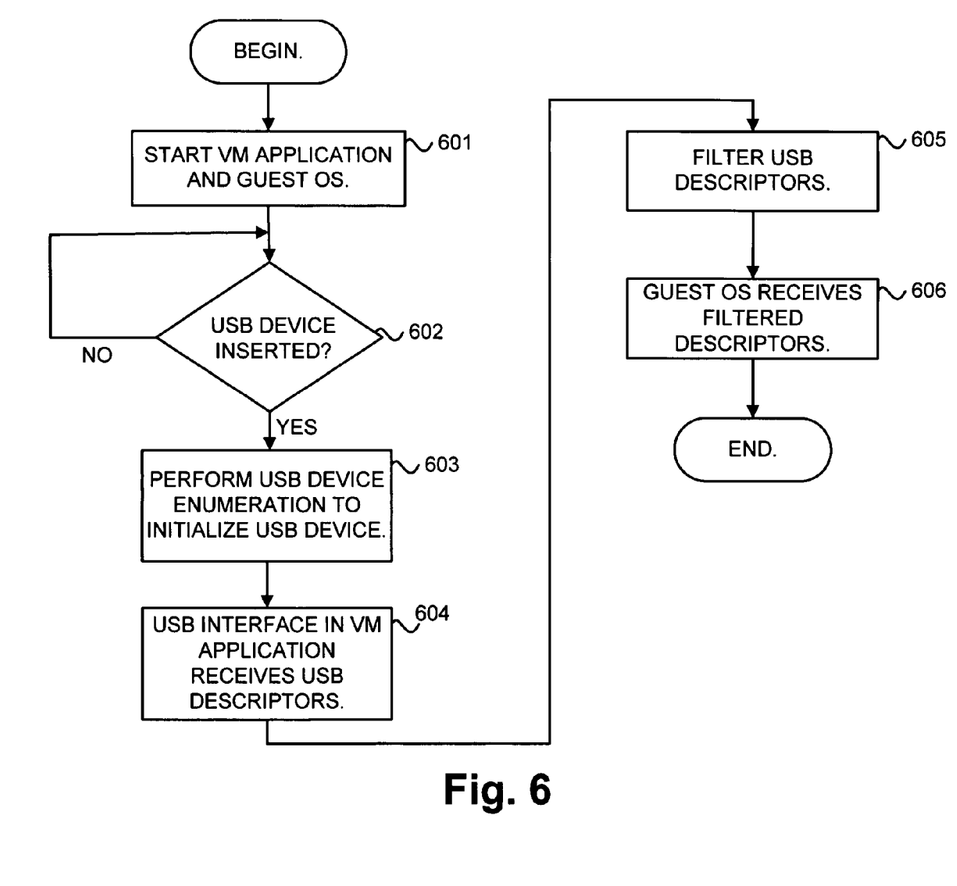
FIG. 6 is a flow chart illustrating exemplary operations for filtering communications between USB devices and guest OSes.

FIG. 6 is a flow chart illustrating exemplary operations for filtering communications between USB devices and guest OSes. Through the operations shown in FIG. 6, USB functions may be selectively filtered or hidden from a guest OS. The operations shown in FIG. 6 will be particularly described with respect to the VM architecture shown in FIG. 4A. The operations shown in FIG. 6, however, could be equally applicable to other VM architectures, such as the one shown in FIG. 4B.

As shown in FIG. 6, a user may initially start the VM application 415 and guest OS 420 (block 601). For example, the user may initiate VM application 415 through the host OS, indicating to VM application 415 which guest OS the user would like to run. The guest OS may be, for example, encapsulated in one or more guest OS files or other data structures.

At some point, a USB device may be inserted into the computing device, such as computing device 505 (block 602). Computing device 505 may detect the insertion of the USB device. For instance, referring to the architecture shown in FIG. 5, USB driver 525, through host controller driver 520, may detect the USB device.

Figure 7:
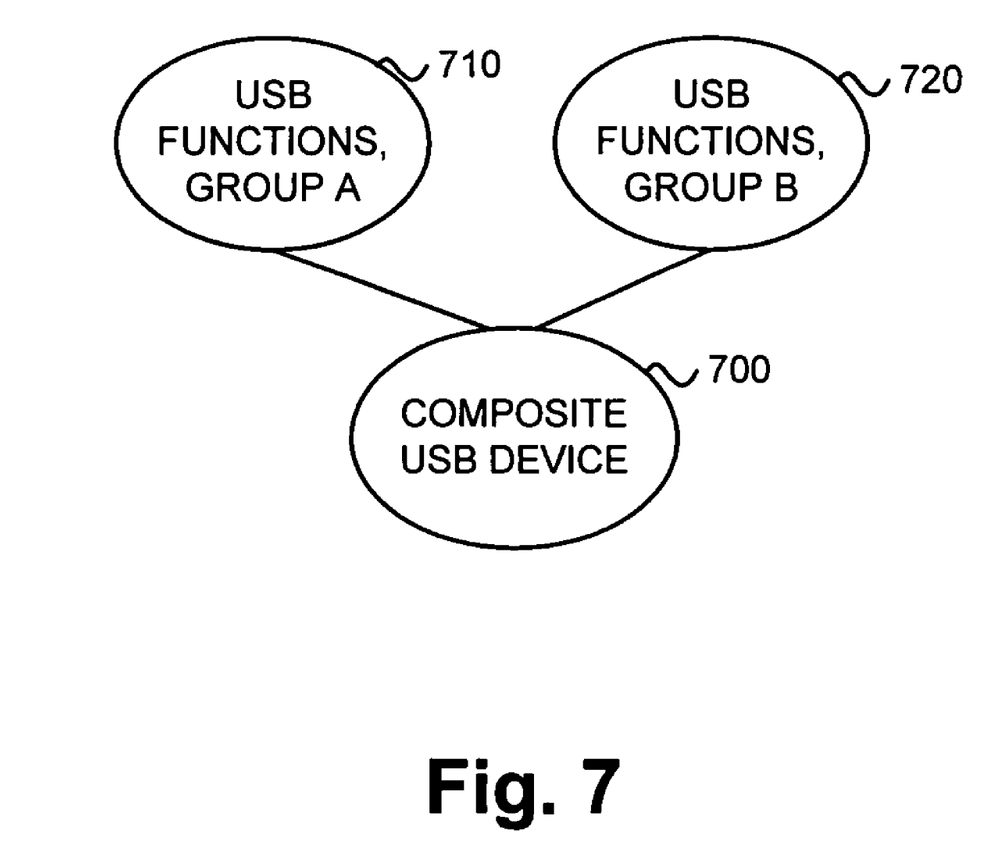
FIG. 7 is a diagram illustrating an exemplary composite USB device.

The inserted USB device may be a composite device. FIG. 7 is a diagram illustrating an exemplary composite USB device 700. A composite USB device is a device that may provide multiple functions over the USB interface. The device may present multiple interfaces, corresponding to the different functions of the USB device, to the host computer. In other words, a single physical USB device may consist of several logical sub-devices that each correspond to one or more functions.

As shown in FIG. 7, composite USB device 700 includes two logical sub-devices, labeled as the functions of "Group A" 710 and the functions of "Group B" 720. As an example of a composite USB device, assume device 700 is a USB webcam with a built in microphone. In this situation, device 700 may be configured as a composite device in which the video functions of the webcam are presented by the USB device as a first logical sub-device (e.g., the functions of Group A 710) and the audio functions of the USB device are presented by the USB device as a second logical sub-device (e.g., the functions of Group B 720). The functions of "Group A" 710 and the functions of "Group B" 720 may each require a separate USB driver to access these functions.

When a new USB device is connected to a USB host, a USB device enumeration process may be initiated to initialize and connect the USB device to the USB host (block 603). For example, the enumeration process may determine the speed of the USB device and USB setup information may be exchanged to determine the type of the device and whether the host supports the device. If the device is supported by the host (or guest) operating system, the device drivers needed for communicating with the device may be loaded by the host and/or guest OS.

As part of the USB device enumeration process, the USB device may tell the host about its capabilities by responding to queries. These responses from the USB device are called descriptors. Through the exchange of descriptors, the USB device may describe its interface(s) to the host. The specific form of the descriptors for different USB functions is standardized as part of the USB protocol.

In the context of the virtual machine architecture shown in FIGS. 4A and 5, VM application 415 (i.e., VM application USB interface 535), through host OS layer 410, may receive the USB descriptors. VM application 415 may appear, to guest OSes 420, as if it is a host controller driver. Guest OSes 420 may then receive the descriptors through VM application 415.

In the context of the virtual machine architecture shown in FIG. 4B, VM application 470 may receive the descriptors directly from hardware layer 455.

Referring back to FIG. 6, VM application USB interface 535 may receive the USB descriptors exchanged as part of the USB device enumeration process (block 604). VM application USB interface 535 may filter the descriptors before forwarding them to the guest OSes (block 605). In one implementation, VM application USB interface 535 may analyze the descriptors and change the descriptors forwarded to the guest OS to hide certain functions from the guest OS. That is, VM application USB interface 535 may be responsible for replacing the number of reported interfaces (functions) and the size of all effected descriptors based on the functions that are to be hidden from the guest OS. For example, given composite USB device 700 (FIG. 7), VM application USB interface 535 may delete the descriptors related to Group A functions 710. VM application USB interface 535 may additionally, if necessary, modify or reformat other descriptors or fields in the exchanged data to make the modified set of descriptors appropriately compliant with the USB protocol.

VM application USB interface 535 may decide which descriptors to hide from guest OSes 420 based on, for example, a list of predefined USB devices. Alternatively or additionally, VM application USB interface 535 may be configured to always hide certain functions from its guest OSes.

Guest OSes 420 may receive the filtered version of the USB descriptors (block 606). The guest OS may then load only the driver for the functions of the USB device that it receives. From the point of view of the guest OS, the USB device will appear as a device that is not capable of the functions that were described in the hidden descriptors. Consequently, the guest OS environment will not be able to use or otherwise access those functions. This can be advantageous in any situation, such as for security or system stability reasons, in which it is desirable to ensure a guest OS does not have access to certain functions of a USB device.

Figure 8A:
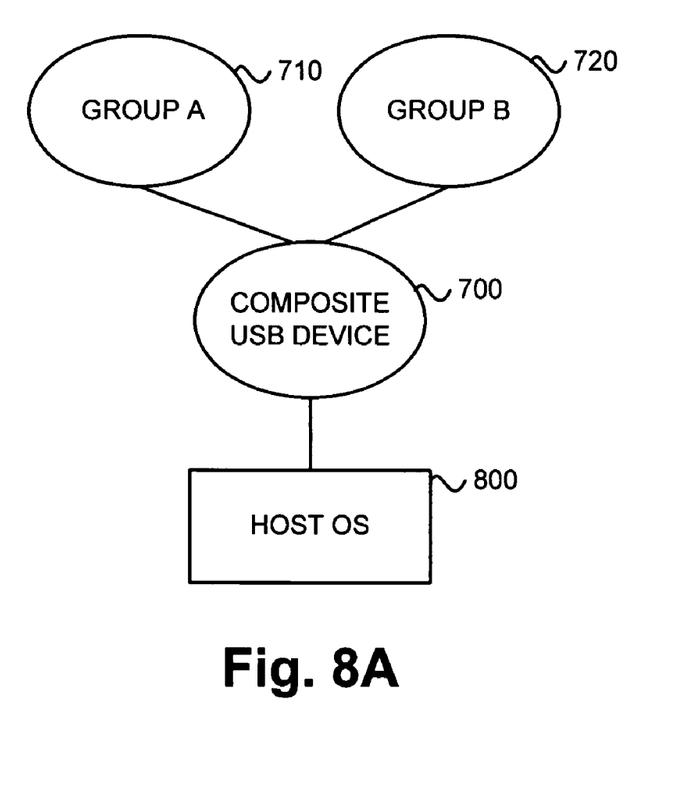
FIGS. 8A and 8B are diagrams illustrating exemplary views of a USB device from the point of view of a host OS and guest OS, respectively.
Figure 8B:
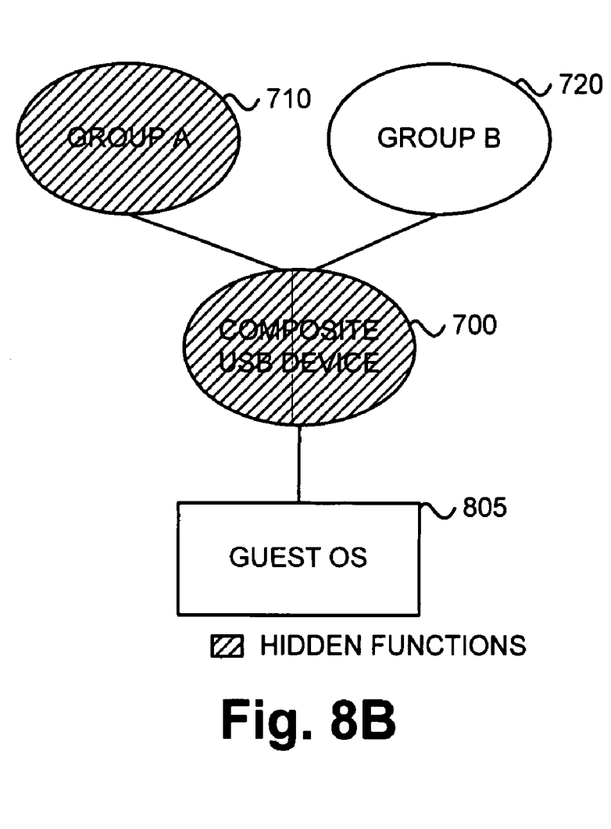

FIGS. 8A and 8B are diagrams illustrating exemplary views of a USB device from the point of view of the host OS 800 (FIG. 8A) and the guest OS 805 (FIG. 8B). As shown in FIG. 8A, host OS 800 receives all of the descriptors associated with composite USB device 700, and thus has a complete view of the USB device. The host OS can thus access the functionality of both Group A 710 and Group B 720 of the USB device. As shown in FIG. 8B, however, in this example, VM application USB interface 535 has hidden the functions of Group A 710 from the USB device. Accordingly, the USB device may not appear as a composite device and instead may appear to the guest OS as a USB device with a single function or group of functions (Group B 720).

Conclusion

The foregoing description of implementations provides illustration, but is not intended to be exhaustive or to limit the implementations to the precise form disclosed. Modifications and variations are possible in light of the above teachings or may be acquired from practice of the teachings.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while a series of processes have been described herein, the order of the processes may be modified in other implementations. Further, non-dependent processes may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A computing device implemented method comprising:
   in response to initial discovery of a Universal Serial Bus (USB) device having a plurality of functions, receiving, at a host operating system, descriptors, wherein each of the descriptors describes a corresponding one of the functions of the USB device;
   filtering the received descriptors to selectively remove at least one of the functions of the USB device; and
   forwarding the filtered descriptors to a guest operating system run by a virtual machine application, where the filtered descriptors are filtered such that the removed function is hidden from the guest operating system.

2. The method of claim 1, where the USB device is a composite device that provides the functions over a USB interface.

3. The method of claim 1, where the filtering is performed for pre-determined USB devices or functions.

4. The method of claim 1, where the USB device is a portable communication device that includes mass storage and networking functions and where descriptors relating to the mass storage function are removed by the filtering.

5. The method of claim 1, where the guest operating system is controlled by a virtual machine application.

6. The method of claim 5, where the virtual machine application presents a virtual hardware platform to the guest operating system.

7. The method of claim 5, where the virtual machine application filters the descriptors.

8. A device comprising:
   a hardware layer that includes computing hardware associated with the device, the computing hardware including hardware to interact with Universal Serial Bus (USB) devices having a plurality of functions;
   a host operating system to interact with the hardware layer; and
   a virtual machine application to control one or more guest operating systems, the virtual machine application filtering descriptors received from the USB devices and forwarding the filtered descriptors to the one or more guest operating systems so that at least one function selected from the functions is not visible from the one or more guest operating systems, wherein each of the descriptors describes a corresponding one of the functions.

9. The device of claim 8, where filtering the descriptors received from the USB devices includes removing descriptors relating to pre-determined features.

10. The device of claim 8, where the USB devices include a composite USB device that provides the functions.

11. The device of claim 10, where the composite device is seen, by the one or more guest operating systems, as a non-composite device having only one or more unselected functions.

12. The device of claim 10, where the host operating system has access to all of the functions of the composite device.

13. The device of claim 8, where the USB devices include a portable communication device that includes mass storage and networking functions over USB and where descriptors relating to the mass storage function are removed by the filtering.

14. The device of claim 8, where the virtual machine application presents a virtual hardware platform to the one or more guest operating systems.

15. A virtual machine application stored in a memory and executing on a computing device, the virtual machine application including:
- instructions to present a virtual computer platform to a guest operating system, the virtual computer platform including a virtual USB interface; and
- instructions to hide selected functions of a USB device connected to the computing device from the guest operating system, where the virtual machine application hides the selected functions of the USB device by filtering USB descriptors communicated during a USB device enumeration process and forwarding the filtered USB descriptors to the guest operating system.

16. The virtual machine application of claim 15, where the USB device includes a composite USB device.

17. A computer-readable storage medium containing instructions executable by at least one processor, the computer-readable medium comprising:
- instructions, in response to initial discovery of a Universal Serial Bus (USB) device having a plurality of functions, to receive, at a host operating system, descriptors, wherein each of the descriptors describes a corresponding one of the functions of the USB device;
- instructions to filter the received descriptors to selectively remove at least one of the functions of the USB device; and
- instructions to forward the filtered descriptors to a guest operating system run by a virtual machine application, where the filtered descriptors are filtered such that the removed function is hidden from the guest operating system.

18. The computer-readable storage medium of claim 17, where the USB device is a composite device that provides the functions over a USB interface.

19. The computer-readable storage medium of claim 17, where the guest operating system is controlled by a virtual machine application.

20. The computer-readable storage medium of claim 19, where the virtual machine application presents a virtual hardware platform to the guest operating system.

\* \* \* \* \*